(12) United States Patent
Valero et al.

(10) Patent No.: US 10,486,978 B2
(45) Date of Patent: Nov. 26, 2019

(54) PROCESS FOR MANUFACTURING CALCIUM ALUMINATES

(71) Applicant: KERNEOS, Puteaux (FR)

(72) Inventors: Remi Valero, Parcieux (FR); Philippe Deffrasnes, Montelimar (FR); Lionel Sever, Saint Mitre les Rem parts (FR); Franck Schroeder, Perigny (FR)

(73) Assignee: KERNEOS, Puteaux (FR)

( * ) Notice: Subject to any disclaimer, the term of this patent is extended or adjusted under 35 U.S.C. 154(b) by 0 days.

(21) Appl. No.: 15/742,154

(22) PCT Filed: Jul. 13, 2016

(86) PCT No.: PCT/FR2016/051811
§ 371 (c)(1),
(2) Date: Jan. 5, 2018

(87) PCT Pub. No.: WO2017/009581
PCT Pub. Date: Jan. 19, 2017

(65) Prior Publication Data
US 2018/0186651 A1    Jul. 5, 2018

(30) Foreign Application Priority Data

Jul. 15, 2015 (FR) ...................... 15 56686

(51) Int. Cl.
*C01F 7/16* (2006.01)
*C04B 7/32* (2006.01)
*C04B 7/44* (2006.01)

(52) U.S. Cl.
CPC ............... *C01F 7/164* (2013.01); *C04B 7/32* (2013.01); *C04B 7/4476* (2013.01)

(58) Field of Classification Search
CPC .......... C01F 7/164; C04B 7/32; C04B 7/4476
See application file for complete search history.

(56) References Cited

U.S. PATENT DOCUMENTS 3,963,508 A    6/1976  Masaryk
9,382,595 B2 *  7/2016  Dube ........................ C22B 7/04

FOREIGN PATENT DOCUMENTS

DE     21 16 495 A1    11/1972
FR     1 013 973 A      8/1952
(Continued)

OTHER PUBLICATIONS

"Particle size analysis—Laser diffraction methods", ISO 13320:2009, Oct. 2009, International Standard, Published in Switzerland.
(Continued)

*Primary Examiner* — James A Fiorito
(74) *Attorney, Agent, or Firm* — Young & Thompson (57) ABSTRACT

Disclosed is a method for manufacturing calcium aluminates in an industrial furnace, according to which, continuously, into a tank made of refractory material containing a molten pool that is constantly heated, fine particles are introduced of a raw material source of alumina and/or of aluminium and of a raw material source of calcium oxide and/or of calcium having a median diameter d50 less than or equal to 6,000 μm in order to melt the fine particles of raw material, and, continuously, at the outlet of the tank a mass of liquid calcium aluminates is recovered.

13 Claims, 2 Drawing Sheets

(56) References Cited

FOREIGN PATENT DOCUMENTS

FR  2 291 162 A1  6/1976
GB    146 133 A   8/1921

OTHER PUBLICATIONS

H. Pollmann et al. "Quantitative Mineralogical, Chemical and Application Investigations of High Alumina Cements From Different Sources", Calcium Aluminate Cements: Proceedings of the Centenary Conference, Avignon, Jun. 30-Jul. 2, 2008.
International Search Report, dated Oct. 14, 2016, from corresponding PCT/FR2016/051811 application.

* cited by examiner

PROCESS FOR MANUFACTURING CALCIUM ALUMINATES

TECHNICAL FIELD TO WHICH THE INVENTION RELATES

This invention relates to the production of calcium aluminates.

It more particularly relates to a method for continuously manufacturing calcium aluminates implementing an industrial melting furnace.

TECHNOLOGICAL BACKGROUND

Calcium aluminates, through their hydraulic and binder properties, make it possible to manufacture cements or concretes that have many qualities. The aluminous cements indeed resist aggressive agents and high temperatures well. They are the source of many technical products such as special mortars, refractory concretes, etc. They can also be used as a mineral reagent associated with other components. They are as such used in various industries, such as the refractory industry, construction chemistry, metallurgical flows (trapping of impurities of metals in fusion), or in the industry of pipes and sanitation networks.

Calcium aluminates can have different mineralogical phases such as $3CaO.Al_2O_3$(C3A in cement notation), $CaO.Al_2O_3$(CA), $CaO.2Al_2O_3$(CA2), $CaO.6Al_2O_3$(CA6) or $12CaO.7Al_2O_3$(C12A7). These mineralogical phases, which express the structure on an atomic scale as well as the chemical composition of the calcium aluminates, influence the final properties, for example the reactivity, of said calcium aluminates.

Furthermore, the final properties, and in particular the reactive properties of the calcium aluminate based products are partially based on the quantity of alumina ($Al_2O_3$) and/or of aluminium (Al) and of calcium oxide (or lime CaO) and/or of calcium (Ca) contained in the calcium aluminate. A calcium aluminate is often qualified by its Al/Ca weight ratio, namely the ratio between the total mass of aluminium and the total mass of calcium contained in the calcium aluminate.

Currently, calcium aluminates are primarily produced using two high-temperature methods, namely according to a method by sintering or according to a method by melting, in cement kilns such as sintering furnaces, rotary flame furnaces, vertical melting furnaces, or electric melting furnaces.

For example document FR2291162 discloses a method for producing calcium aluminates by sintering which consists in calcinating, i.e. in heating in the solid state raw materials sources of calcium, for example lime CaO, and raw materials sources of aluminium, for example alumina $Al_2O_3$, in a rotary flame furnace, at a temperature between 1,400° C. and 1,600° C.

Generally, a rotary furnace is comprised of a tube, slightly inclined, covered on its inside face with refractory bricks, with a flame being arranged at the bottommost end of the tube. The sources of calcium and of aluminium are then introduced into the furnace by the highest end. They are then generally heated to a temperature between 1,400 and 1,600 degrees Celsius (° C.) for a duration of about 30 minutes before being discharged into the bottom portion, in the vicinity of the flame.

Such a method by sintering consists of a surface reaction between the powdery raw materials that react together without passing through a generalised liquid state.

According to the method described in this document FR2291162, the raw materials used must have a granulometry smaller than 208 micrometres in order to allow for their calcination. The clinker obtained has more than 80% of mineralogical phase CA.

It is therefore necessary to very finely grind the raw materials, which is expensive and constraining.

It is moreover known in document FR1013973, a method for producing calcium aluminates by melting according to which raw materials sources of calcium and of aluminium are heated until liquid state in a rotary flame furnace, at temperatures in the vicinity of 1,430° C. to 1,450° C.

The raw materials sources of calcium ($CaCO_3$ limestone) and of aluminium (ferruginous bauxite, a mineral rock rich in alumina and containing iron, silica and other compounds in variable quantities) used in such a method are firstly ground very finely in order to pass through the screen no. 4900, then mixed and compacted in order to be formed into briquettes. The briquettes generally have an average dimension between 15 millimetres (mm) and 20 centimetres (cm).

According to the method described in this document FR1012973, the method is discontinuous and sequenced: first the briquettes of raw material are loaded, these briquettes of raw material are then heated by rotating the furnace slowly until a uniform melted mass is obtained, and the melted mass is drained via a casting tube. In practice, the melted mass is gathered immediately after having reached the melting temperatures of the raw materials.

On the other hand document DE2116495 discloses a method for producing calcium sulfo-aluminates by melting in an electric furnace.

The raw materials used in this method are a source of alumina which average granulometry (i.e. the maximum value of the granulometric distribution) is smaller than 5 mm and a source of calcium oxide such as lime which average granulometry is one to ten times greater than that of alumina.

The method described in this document DE2116495 is a sequenced method, a sequence corresponding to the load of raw materials, to the melting thereof, and to a partial unloading of the melted mass.

Thus, these known methods by melting are implemented in furnaces wherein it is necessary to operate in a sequenced and discontinuous manner.

Furthermore, known melting furnaces have several operating modes (for example an operating mode for loading and an operating mode for unloading) and their operation requires many passages from one operating mode to another.

It is finally known that a vertical melting furnace can be used to carry out methods by melting.

This vertical melting furnace has a vertical portion which height can reach about ten metres and a globally horizontal portion from which the liquid mass of calcium aluminates obtained is gathered.

More particularly, blocks of limestone and of bauxite are loaded via an opening of an upper zone of the furnace in the vertical portion of the melting furnace and they are heated via a flame arranged in a lower zone of the furnace. The flame heats the blocks to a temperature in the vicinity of 1,500° C. in order to melt them and form a liquid mass which is directly gathered through a casting hole.

During the method, combustion gases form and flow against the pathway of the blocks. They are exhausted through a chimney located in the upper zone of the furnace, in its vertical portion. These combustion gases, having a temperature greater than 1,500° C., circulate between the blocks and preheat them.

Before being put into contact with the flame, the blocks of raw materials thus undergo a drying, then a dehydration and a decarbonation due to the combustion gases rising through the vertical portion of the melting furnace.

Such a method imposes the use of raw materials in blocks, excluding fine particles which would cause blockage and damages to the vertical portion of this melting furnace.

Thus, the known methods for the production of calcium aluminates by melting or by sintering are all constraining in terms of the granulometry of the raw materials used (fine grinding of the raw materials; grinding then compaction on the form of briquettes; specific granulometric ratio between the lime and the alumina; or the use of blocks of bauxite).

In particular, in the case of the method by melting in the vertical melting furnace, the blocks of bauxite on the market are less and less available. Furthermore, during the extraction, the yield of production of the blocks of bauxite is low. Indeed, for 100 tonnes of ore extracted, only 10 tonnes of crude bauxite are obtained which themselves contain 8 tonnes of fine particles that cannot be used in the method by melting in the vertical furnace, and 2 tonnes of bauxite in blocks that can be used, along with 90 tonnes of sterile items that cannot be used by the industries.

OBJECT OF THE INVENTION

In order to overcome the aforementioned disadvantages of prior art, this invention proposes a method for manufacturing calcium aluminates by melting that is not very constraining with regards to the granulometry of the raw materials, which does not require the use of blocks of bauxite and which makes it possible to valorise the fine particles of the extracted raw materials which are available on the market. Furthermore, this invention proposes a method wherein the changes in the operating mode of the furnace are limited.

More particularly, the invention proposes a method for manufacturing calcium aluminates in an industrial furnace, according to which:

a) continuously, fine particles of a raw material source of alumina ($Al_2O_3$) and/or of aluminium (Al) and of a raw material source of calcium oxide (CaO) and/or of calcium (Ca) having a median diameter d50 smaller than or equal to 6,000 μm are introduced into a tank made of refractory material containing a molten pool that is constantly heated, in order to melt said fine particles of raw material, and b) continuously, a mass of liquid calcium aluminates is gathered at the outlet of the tank.

The median diameter d50 of any set of particles is a physical quantity that represents the statistical distribution of the size of these particles, in other words the granulometry of this set of particles.

The median diameter d50 is a reference diameter defined as the diameter under which can be found 50% of the fine particles used, by weight relative to the total weight of the set of said fine particles.

In other words, for a set of fine particles having a given median diameter d50, 50% by weight of these fine particles has a diameter smaller than this given median diameter d50, and 50% by weight of these fine particles has a diameter greater than this given median diameter d50.

Here "diameter" means the largest dimension of the particle, regardless of its shape.

The median diameter d50 of a set of fine particles is obtained using a granulometric curve that represents the statistical distribution of the size of each one of the fine particles of this set.

In practice, the median diameter d50 of a set of fine particles can be determined by different techniques, such as the method of sedimentation (detection by absorption of XR) or the method of laser diffraction (standard ISO 13320).

In the framework of this invention, the size of the fine particles is measured according to the standard ISO 13320 by the method of laser diffraction with, for example, a laser type granulometer Mastersizer 2000 or 3000 sold by the Malvern company.

Advantageously, the method according to the invention makes it possible to use very fine particles as well as fine particles of raw materials.

In other words, thanks to the method according to the invention, the granulometric constraints on the raw materials used are greatly reduced.

In particular, thanks to the method according to the invention, it is not necessary to use particles in the form of blocks, nor to compact particles that are already fine, nor to reduce the particles into a very fine powder form.

Furthermore, thanks to the method according to the invention, the introduction of the raw materials and the gathering of the mass of liquid calcium aluminates are carried out continuously, all throughout the operation of the furnace. The furnace therefore operates substantially according to a stable operating mode, without commutations from a "loading" operating mode to an "unloading" operating mode. In this stable operating mode of the furnace according to the method of the invention, the usual operating parameters of the furnace, such as the heating temperature, the granulometry of the particles introduced, the chemical composition of the raw materials introduced can be adjusted.

Advantageously, the manufacturing method according to the invention uses fine particles of raw material that are not valued in current technology, that come from the extraction and from the treatment of ore in order to manufacture calcium aluminates by melting.

Thus, the method according to the invention makes it possible to use raw materials that cannot be used in the method by melting in current vertical melting furnaces.

Furthermore, here, these fine particles are directly plunged into a pool of calcium aluminates heated to a temperature allowing for their melting. Thus, at the outlet of the tank is gathered a mass of liquid calcium aluminate that is homogenous, i.e. without unmelted items.

"Unmelted items" means particles of raw materials that are still in solid form, which did not react during the method.

In addition, according to the method in accordance with the invention, and contrary to existing methods of prior art, it is possible to avoid performing prior steps of dehydration and of decarbonation of the raw materials used, this dehydration and this decarbonation occurring directly in the molten pool.

Moreover, according to the method in accordance with the invention, the bubbles generated by the decarbonation of the raw materials during their melting in the molten pool naturally participate in the stirring of this molten pool. This natural stirring mixes the solid fine particles with the liquid matter contained in the molten pool, as such favouring the melting of said fine particles. Consequently, this natural stirring participates in improving the homogeneity of the liquid mass of calcium aluminates obtained. The method according to the invention thus stabilises the quality of the finished products obtained.

Advantageously, in step a) of the manufacturing method according to the invention, the molten pool is placed under a reducing atmosphere comprising carbon monoxide (CO).

In particular, said reducing atmosphere comprises nearly 0.1% to 100% of carbon monoxide (CO), on average.

Advantageously, the reducing atmosphere in which the molten pool is placed makes it possible to control, at least partially, the mineralogical phases of the calcium aluminates obtained, for a given proportion of lime and of alumina contained in said calcium aluminate.

The "mineralogical phases" describe both the structure on the atomic scale and the chemical composition of the calcium aluminate. For example, these mineralogical phases are: the phase C3A ($3CaO.Al_2O_3$), the phase CA ($CaO.Al_2O_3$), the phase CA2 ($CaO.2Al_2O_3$), the phase CA6 ($CaO.6Al_2O_3$) or the phase C12A7 ($12CaO.7Al_2O_3$).

Calcium aluminates used as hydraulic binders, i.e. as a material able to react with water in order to form a paste that cold-hardens and agglomerates together some aggregates, in general contain a substantial quantity of mineralogical phase CA, which allows for the development of high mechanical resistance after hydraulic setting.

The hardening of the hydraulic binder is called "hydraulic setting".

Furthermore, the mineralogical phase C12A7 influences the reactivity of the calcium aluminate used as a hydraulic binder.

More precisely, the mineralogical phase C12A7 is an accelerator of the setting of the calcium aluminate of which the main phase is the mineralogical phase CA. In other words, calcium aluminates harden faster in contact with water when they contain a large proportion of mineralogical phase C12A7, with respect to the other mineralogical phases that may be contained in said calcium aluminate.

Thus, the mineralogical phase C12A7 has a high impact on the workability of the hydraulic binder, and on its hardening in the short term. In particular, a variation in the weight proportion of the phase C12A7 in the calcium aluminate by a few percentage points, even less than 1 percent, can have measurable consequences on the workability and the hardening of the hydraulic binder.

As calcium aluminates can be used for various applications, according to which a user prefers a fast or slow hydraulic setting, it is especially interesting to be able to control the proportion of mineralogical phase C12A7 contained in calcium aluminates. The target proportion of mineralogical phase C12A7 contained in the calcium aluminate intended for a given application is for example determined with a precision between 0.1% and 0.5%, for example equal to 0.1%; 0.2%; 0.3%; 0.4%; 0.5%.

Advantageously, the method according to the invention allows for such control.

Other non-limiting and advantageous characteristics of the method in accordance with the invention, taken individually or in any technically permissible combination, are as follows:
- the temperature of the molten pool of the calcium aluminates is comprised between 1,300° C. and 1,700° C.;
- the temperature of the molten pool of the calcium aluminates is comprised between 1,400° C. and 1,600° C.;
- the residence time of said fine particles of raw material in said molten pool of calcium aluminates is less than 24 hours;
- the residence time of said fine particles of raw material in said molten pool of calcium aluminates is comprised between 30 minutes and 9 hours;
- in step a), the raw material source of alumina and/or of aluminium introduced into the tank is chosen from: bauxite, corundum grinding wheels, catalyst supports, refractory bricks, hydroxides, metallurgical aluminas, calcinated and melted aluminas, the by-products of the aluminium sector and manufacturing non-conformities with a high alumina content or one of the mixtures thereof, and the raw material source of calcium oxide and/or of calcium introduced into the tank is chosen from: limestone, lime and the by-products coming from methods that consume limestone and lime such as slurries or slags in steelmaking or electrometallurgy, or one of the mixtures thereof;
- the fine particles of raw material have a median diameter d50 comprised between 100 µm and 1,000 µm;
- the fine particles of raw material have a median diameter d50 comprised between 150 µm and 500 µm;
- after step b), the mass of liquid calcium aluminates gathered at the outlet of the tank is cooled down;
- the cooling is performed naturally;
- the cooling is performed in a controlled manner;
- the cooled mass of calcium aluminates is crushed in order to form a calcium aluminate cement;
- said fine particles of raw material source of alumina ($Al_2O_3$) and/or of aluminium (Al) and of raw material source of calcium oxide (CaO) and/or of calcium (Ca) are introduced into the tank in the form of a free power.

DETAILED DESCRIPTION OF AN EMBODIMENT

The following description with regards to the annexed drawings, given by way of non-limiting examples, will be useful to better understand what the invention consists of and how it can be achieved.

In the rest of the description and unless specified otherwise, the indication of an interval of values "from X to Y" or "between X and Y" means that the values X and Y are included.

Device

Figure 5:
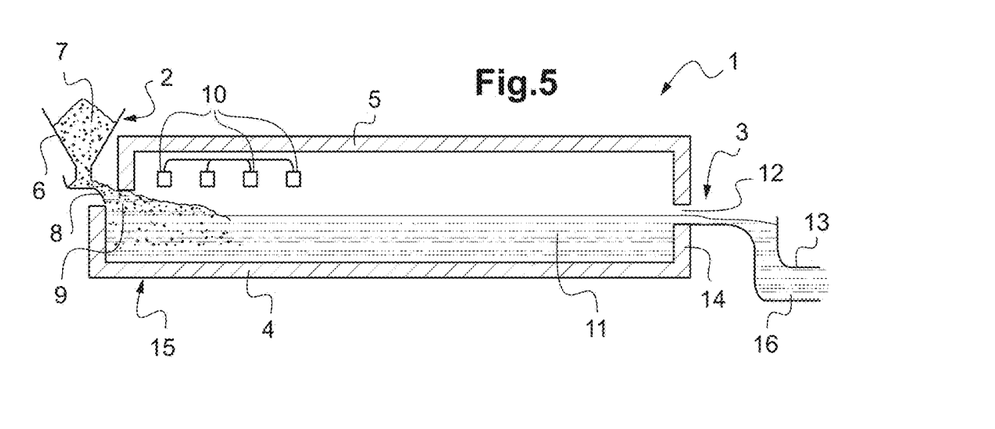
FIG. 5 is a schematic cross-section view of a furnace allowing for the implementation of the method for manufacturing the calcium aluminates in accordance with the invention.

FIG. 5, partially and schematically shows an example of a furnace 1 suitable for implementing the method for manufacturing calcium aluminates according to this invention.

On the whole, this furnace 1 comprises a horizontal tank 15—a sort of pool—covered by a dome 5, and a fume exhaust opening (not shown).

This tank 15 is adapted to contain a molten pool 11 obtained and maintained in liquid state by a heating system 10 of the furnace 1.

The tank 15 is also adapted to receive via an inlet opening 9 solid raw materials 7 and to discharge via an outlet opening 12 melted materials, namely a mass of liquid calcium aluminates 16.

To this effect, the furnace 1 comprises a loading system 2 for loading the raw materials 7, connected to the inlet opening 9 of the tank 15, and a discharge system 3 for discharging melted materials, connected to the outlet opening 12 of the tank 15.

As explained in details hereinbelow, this arrangement creates a flow of material between the inlet 9 of the tank 15 and the outlet 12 of this tank 15.

In this furnace 1, there is therefore a real flow of material supplied by the raw materials 7 continuously introduced by the inlet opening 9, which are transformed in the molten pool 11 into liquid calcium aluminates, which themselves are discharged via the outlet opening 12.

The term "residence time" shall be used in what follows to designate the time that elapses between the introduction of a particle of raw material into the molten pool 11 of the tank 15 of the furnace 1 and the discharge thereof via the outlet opening 12.

More precisely, as shown in FIG. 5, the tank 15 here defines a globally parallelepipedal volume.

The walls of this tank 15 comprise in particular a hearth 4 constituting the bottom of the tank 15 and a peripheral wall 14 that rises vertically from the hearth 4.

The hearth 4 here has a rectangular shape such that the peripheral wall 14 comprises four panels arranged two-by-two at right angles.

Of course, according to other embodiments of the furnace, the tank can have a different shape. In particular, the hearth and the peripheral wall could have different shapes and form different angles with each other in order to optimise the flow between the inlet and the outlet of the tank but also the distribution of the raw material in the molten pool and the discharge of the melted material.

One of these four panels of the peripheral wall 14, called inlet panel, comprises the inlet opening 9 of the tank 15 which allows the loading system 2 of raw materials 7 to access the tank 15.

The panel opposite the inlet panel, called outlet panel, comprises the outlet opening 12 of the tank 15, also called casting hole, which makes it possible to connect the tank 15 to the discharge system 3 of melted materials.

The passage of the flow of materials is thus carried out in the longitudinal direction of the furnace 1, from the inlet opening 9 to the outlet opening 12 of the tank 15.

The raw material resides for a more or less long time in the tank 15 according to the size of this tank 15.

The laboratory surface of the tank 15, i.e. the internal surface of the tank 15 intended to be in contact with the molten pool 11, is comprised between 20 m² and 200 m², preferably it is equal to about 100 m².

The walls of the tank 15 and of the dome 5 are covered interiorly with a refractory material that is chemically inert with calcium aluminates.

The refractory material of the tank 15 and/or of the dome 5 is chosen from agglomerated refractory materials or electrocast refractory materials and/or one of the mixtures thereof.

More precisely, the nature of the refractory materials used can depend on their location in the furnace (dome, tank) and on the associated stresses. Thus, it is possible to use agglomerated or electrocast refractory materials for the dome 5 and electrocast refractory materials for the tank 15.

These two families of agglomerated and electrocast refractory materials are differentiated firstly by their forming methods: a casting of the foundry type for the electrocast refractory materials and a sintering in the case of agglomerated refractory materials.

Thus, agglomerated refractory materials are sintered ceramic materials, with large or small grains, obtained by unidirectional or isostatic pressing, by vibrocasting or by slip-casting. They are characterised by an open porosity that can reach 20%, reduced in the case of materials pressed isostatically. In this category, several chemical compositions of refractory products are distinguished.

The most common chemical compositions of agglomerated refractory materials are summarised in Table 1 hereinbelow.

These chemical compositions are given as a weight percentage. The weight percentage of the compounds (MgO, $CrO_3$, $Al_2O_3$, $ZrO_2$, $SiO_2$, CaO, $FeO_3$) is sometimes given in the form A/B, which means that the agglomerated refractory material in question comprises, by weight as compared to the total weight of said agglomerated refractory material, from A % to B % of compound.

TABLE 1

| Component | MgO | $CrO_3$ | $Al_2O_3$ | $ZrO_2$ | $SiO_2$ | CaO | $FeO_3$ |
|---|---|---|---|---|---|---|---|
| Magnesia | 95/98 | — | 0.5 | — | 0.4/3 | 1.5/1.8 | 0.5 |
| Magnesia chrome | 50/81 | 15/30 | 4/10 | | 0/1.5 | 0.6/1.8 | 7/18 |
| Magnesia zircon | 73/78 | 6/18 | 1 | 13 | 6/11 | — | 0.8 |
| Spinel | 29.5 | — | 70 | — | 0.2 | 0.5 | 0.5 |
| Chromite | 25 | 35 | — | — | — | — | 15 |
| Alumina Silica | | | 50/65 | | 30/40 | | 0/1 |
| Alumina Chrome | | 10/30 | 60/85 | 1/4 | 1/3 | | 0/1 |
| Alumina Spinel | 4/6 | | 90/96 | | | | |

Electrocast refractory materials have a lower porosity than agglomerated refractory materials. They also have an organisation of the crystalline structure that makes it possible to substantially increase their resistance to corrosion.

Four families of electrocast refractory materials are primarily distinguished: Alumina-Zirconia-Silica (AZS), Alumina-Zirconia-Silica-Chrome (AZSC), very high zirconia content (THTZ) and High Alumina content (HA).

The table 2 hereinbelow summarises the chemical compositions of a few electrocast refractory materials. These chemical compositions are given as a weight percentage. As in table 1, the weight percentage of the compounds is sometimes given in the form A'/B', which means that the electrocast refractory material in question comprises, by weight as compared to the total weight of said electrocast refractory material, from A' % to B' % of compound.

TABLE 2

| Component | $Al_2O_3$ | $ZrO_2$ | $SiO_2$ | $Na_2O$ | CaO, $TiO_2$, $Fe_2O_3$ | $Cr_2O_3$ |
|---|---|---|---|---|---|---|
| AZS | 46/51 | 32/41 | 12/15 | 1.13 | 0.3 | — |
| THTZ | 0.85 | 94 | 4.5 | 0.4 | 0.3 | — |
| AZSC | 28 | 27 | 14 | 1.1 | 2.4 | 27 |
| HA | 95 | | | 4 | 0.5 | |

The tank 15 formed as such is adapted to contain the molten pool 11. This molten pool 11 is here a pool of molten calcium aluminate.

The heating system 10 is adapted to constantly heat the molten pool 11 contained in the tank 15.

Here, the heating system 10 equips the inner face of the dome 5.

This is preferentially a heating system 10 by combustion which includes flame burners such as oil or gas burners.

For example, this is an air combustion heating system wherein the combustion agent is the dioxygen ($O_2$) coming from the air.

An oxy-combustion heating system can also be envisaged wherein the combustion agent would be the dioxygen ($O_2$) coming from a source of pure dioxygen.

Furthermore, the furnace 1 may possibly comprise a heat regenerating system that is not shown here.

This regenerating system is made from refractory materials such as those used for the dome 5 or the tank 15.

Advantageously, this heat regenerating system is generally combined with the heating system 10 in order to recycle the combustion energy. It makes it possible to increase the thermal yields of the furnace. This is for example stacks of refractory bricks passed through by many channels wherein alternately circulate the gases coming from the combustion and the air or the pure dioxygen used for combustion: the gases transfer their energy to the bricks which restore it during the passage of the air or of the pure dioxygen.

According to an alternative of the furnace not shown, it may be provided that the heating system of the molten pool be electric.

This heating system could for example comprise immersible electrodes or electrodes arranged at the bottom of the tank.

These electrodes could be electrodes made of molybdenum.

Moreover, from a global point of view, the tank 15 topped with the dome 5 forms a partially-closed chamber containing the molten pool 11.

It is possible to choose the composition of the gases contained in this chamber above the tank 15.

Advantageously, here, the partially-closed chamber is adapted to receive a mixture of gases containing carbon monoxide (CO) which forms a reducing atmosphere above the tank 15.

More precisely, said reducing atmosphere comprises the gases in contact with the surface of the molten pool 11 contained in the tank 15.

With the heating system 10 by combustion of the furnace 1 described hereinabove, namely the air combustion heating system or the oxy-combustion heating system, the atmosphere in the chamber naturally contains carbon monoxide (CO) coming from the combustion.

In particular, it is possible to control the content in carbon monoxide (CO) of the gases contained in the chamber by precisely controlling the combustion reaction, and in particular the stoechiometry of the combustion agents ($O_2$) and fuel (oil, gas) reagents.

Advantageously, it can also be envisaged adding a supplying system for supplying the chamber with carbon monoxide (CO) (not shown).

In the furnace 1 that has the heating system 10 by combustion, the content in carbon monoxide (CO) is not homogeneous across the entire chamber, i.e. it is not identical at all points in the chamber. In general, for reasons of stoechiometry mentioned hereinabove, it is generally higher near the flame burners.

This is then referred to as the "average" content in carbon monoxide (CO). This "average" content in carbon monoxide (CO) is evaluated in the gasses exhausted from the chamber through the exhaust opening of the fumes (not shown) of the furnace 1. It is for example measured by a sensor arranged in a smoke exhaust duct wherein opens said smoke exhaust opening into.

In the case with the alternative comprising the electric heating system, the furnace will necessarily be provided with an artificial system for adding carbon monoxide (CO).

The electric furnace can also comprise a means for monitoring the content in carbon monoxide (CO) of the atmosphere contained in the chamber.

This means of monitoring the content in carbon monoxide (CO) makes it possible to precisely adjust the content in carbon monoxide (CO) in the chamber.

The carbon monoxide (CO) is for example injected pure into the chamber where it is mixed with the ambient air. It can also be introduced directly as a mixture with air.

It can also be injected pure in such a way that the chamber comprises only carbon monoxide (CO).

Furthermore, as shown in FIG. 5, the loading system 2 of the furnace 1 is connected to the inlet opening 9 of the tank 15.

This loading system 2 comprises a silo 6 in the shape of a funnel that allows for the storage, and even the homogenisation of the raw materials 7, and an access ramp 8 allowing for the introduction of these raw materials 7 into the tank 15 via the inlet opening 9 of this tank 15.

The access ramp 8 is a duct of which one end is connected to the outlet of the silo 6 and of which the other end opens into the inlet opening 9 of the tank 15.

The raw materials 7 can circulate by gravity from the silo 6 to the inlet of the tank 15 via the access ramp 8. A pushing system (not shown) can be provided in order to force this circulation.

In practice, here, said raw materials 7 comprise a raw material source of alumina ($Al_2O_3$) and/or of aluminium (Al), and a raw material source of calcium oxide (CaO) and/or of calcium (Ca).

Said raw material source of alumina ($Al_2O_3$) and/or of aluminium (Al) designates any chemical compound that contains a group of atoms $Al_2O_3$ and/or an atom of aluminium.

Similarly, said raw material source of calcium oxide (CaO) and/or of calcium (Ca) designates any chemical compound that contains a CaO group of atoms CaO and/or an atom of calcium.

As such, alternatively, the silo 6 can possibly include two separate compartments (not shown) able to respectively receive said raw material source of alumina ($Al_2O_3$) and/or of aluminium (Al), and said raw material source of calcium oxide (CaO) and/or of calcium (Ca). It could for example be considered that these separate compartments open downstream into a common portion of the silo 6 located upstream of the outlet of said silo 6. In this common portion, said raw material source of alumina ($Al_2O_3$) and/or of aluminium (Al) and said raw material source of calcium oxide (CaO) and/or of calcium (Ca) are then mixed in order to form the raw materials 7.

Regardless of the alternative considered for the loading system 2, this loading system 2 makes it possible to supply the molten pool 11 with raw materials 7, and this continuously.

In addition, as well shown in FIG. 5, the discharge system 3 of the furnace 1 is connected to the outlet opening 12 of the tank 15.

The discharge system 3 of the mass of liquid calcium aluminates 16 comprises a discharge duct 13 connected, on one side, to the outlet opening 12 of the tank 15, and which opens, on the other side, onto a cooling zone (not shown) of the calcium aluminates.

The outlet opening 12 of the tank 15 is a so-called "overflow" outlet in that the melted material, namely melted calcium aluminate, is discharged from the tank 15 by overflowing of the latter into the discharge duct 13.

Advantageously, this overflow outlet opening 12 is compatible with the very high temperatures of the molten pool 11.

Method

In the rest of the description, we shall specifically provide more detail on the method for manufacturing calcium aluminates, implemented by an operator in the industrial furnace 1 described hereinabove.

Remarkably, according to this method:

a) continuously, fine particles of said raw material source of alumina ($Al_2O_3$) and/or of aluminium (Al) and of said raw material source of calcium oxide (CaO) and/or of calcium (Ca) having a median diameter d50 less than or equal to 6,000 µm are introduced into the tank 15 made of refractory material containing the molten pool 11 that is constantly heated, in order to melt said fine particles of raw material, and b) continuously, a mass of liquid calcium aluminates 16 is gathered at the outlet of the tank 15.

In a step prior to step a), the operator prepares the molten pool 11.

For this, when the furnace 1 is initiated, the tank 15 is initially loaded with a preliminary mixture of calcium aluminates.

This preliminary mixture is heated by the heating system 10 in such a way as to obtain a liquid mass, without unmelted items, of molten calcium aluminate. This liquid mass then forms the initial molten pool present in the tank 15 at the beginning of the implementation of the manufacturing method according to the invention.

The molten pool 11 is formed by this initial molten pool, to which said raw material source of alumina ($Al_2O_3$) and/or of aluminium (Al), and said raw material source of calcium oxide (CaO) and/or of calcium (Ca) is added, which will in turn melt.

Thus, in the rest of the description, the molten pool 11 designates a liquid mass, without unmelted items, of molten calcium aluminate.

The volume of the initial molten pool is such that it is flush with the overflow outlet opening 12 of the tank 15.

The Al/Ca mass ratio of the preliminary mixture of calcium aluminate initially loaded into the tank 15, namely the ratio between the total weight of aluminium (Al) and the total weight of calcium (Ca) contained in this preliminary mixture, is close to that of the calcium aluminate that the operator wants to recover at the outlet of the tank 15, but not necessarily identical to the latter.

Indeed, the Al/Ca mass ratio of the calcium aluminate contained in the tank 15—i.e. forming the molten pool 11—changes during the course of the method, by the introduction, in step a), of the raw materials 7. Thus, it must be understood that the Al/Ca mass ratio of the calcium aluminate gathered at the outlet of the tank 15 can be different from that of the calcium aluminate initially loaded into the tank 15.

The Al/Ca mass ratio of the calcium aluminate gathered at the outlet of the tank 15 tends to become equal to the Al/Ca mass ratio of the raw materials introduced.

Thus, there is a transitional regime during which the Al/Ca mass ratio of the calcium aluminate gathered at the outlet of the tank is different from the Al/Ca mass ratio of the raw materials introduced.

At the end of the transitional regime, the Al/Ca mass ratio of the calcium aluminate gathered at the outlet of the tank becomes equal to the Al/Ca mass ratio of the raw materials introduced at the tank inlet.

Conventionally, it is deemed that the duration of the transitional regime is at most equal to 5 times the residence time of the particles in the tank 15.

For example, for a residence time of about 1 hour, it is deemed that the transitional regime is completed after 5 hours.

In step a), the operator loads the loading system 2 with raw material 7 containing a raw material source of alumina ($Al_2O_3$) and/or of aluminium (Al), and a raw material source of calcium oxide (CaO) and/or of calcium (Ca).

In this step a), the operator introduces into the furnace 1, via the inlet opening 9 of the tank 15, in the form of fine particles, said raw material source of alumina ($Al_2O_3$) and/or of aluminium (Al), and said raw material source of calcium oxide (CaO) and/or of calcium (Ca).

Here, "fine particles" means a free powder having a median diameter d50 smaller than or equal to 6,000 µm.

The free powder is considered as a fractioned state of the solid material that is then in the form of very small pieces.

Advantageously, a free powder that has such a median diameter d50 has a large specific surface area favourable to the melting thereof in the molten pool 11.

The sets of fine particles having a median diameter d50 smaller than or equal to 6,000 µm are for example those having the following median diameters d50: 6 mm; 5 mm; 4 mm; 3 mm; 2 mm; 1 mm; 500 µm; 250 µm; 150 µm; 100 µm; 50 µm; 25 µm, and less.

Preferably, the median diameter d50 of the fine particles suitable for the method according to the invention is greater than or equal to 25 µm and smaller than or equal to 6 mm.

Indeed, fine particles that have a median diameter d50 smaller than 25 µm could result in a clogging of the furnace 1. Fine particles having a median diameter d50 greater than 6 mm could lessen the production and/or the quality of the calcium aluminates by generating unmelted items in the molten pool 11, and then at the outlet of the tank.

More preferably, the fine particles have a median diameter d50 comprised between 100 µm and 1,000 µm.

Yet more preferentially, they have a median diameter d50 comprised between 150 µm and 500 µm.

Ideally, the median diameter d50 of the fine particles is 250 µm.

Furthermore, the maximum diameter of the fine particles is another characteristic dimension that makes it possible to choose the fine particles that are most suited for carrying out the invention.

The maximum diameter is a reference diameter defined as the diameter under which is located 100% of the fine particles used.

In other words, all of the fine particles of the considered set of particles have a diameter smaller than the maximum diameter.

Preferably, the fine particles have a maximum diameter smaller than or equal to 20,000 µm, i.e. smaller than or equal to 2 cm.

As such, the sets of fine particles having the following maximum diameters can be suitable for carrying out the invention: 20,000 µm; 19,000 µm; 18,000 µm; 17,000 µm; 16,000 µm; 15,000 µm; 14,000 µm; 13,000 µm; 12,000 µm; 11,000 µm; 10,000 µm; 9,000 µm; 8,000 µm; 7,000 µm; 6,000 µm; 5,000 µm; 4,000 µm; 3,000 µm; 2,000 µm; and less.

Generally, the maximum diameter of the fine particles is chosen in such a way as to ensure the complete melting of all of the fine particles during the residence time of these fine particles in the tank of the furnace. This maximum diameter therefore depends on the size of the tank of the furnace.

The bigger the maximum diameter of the fine particles is, the more the residence time that allows for the complete melting of these fine particles increases and the more the size of the furnace has to be big.

Very advantageously, the method according to the invention can be easily and quickly adapted to many sizes of particles.

The maximum diameter of the fine particles used is determined according to the price of purchasing and/or of producing these fine particles and the size of the furnace 1.

To date, the particles are all the more expensive as they are small because they generally require a step of crushing. It is therefore economically interesting to use particles that are as large as possible, which do not require any specific crushing or specific compaction. But a long tank length, required for the melting of the largest particles, imposes a great furnace size, therefore a higher cost for the construction and maintenance of this furnace.

In the case where the price of purchasing and/or producing the smallest particles were to decrease, it would probably become advantageous to use these particles rather than large particles, and the maximum diameter of the particles could be lowered.

Figure 1:
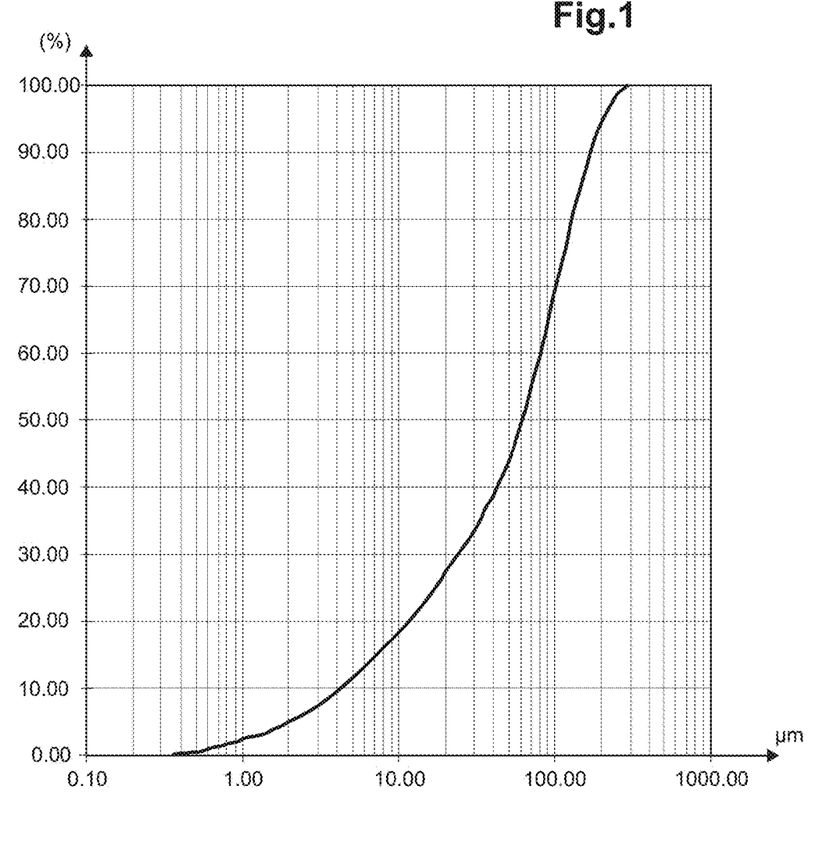
FIG. 1 is a granulometric curve of a first set of particles of bauxite suitable for the method according to the present invention.

By way of example, FIG. 1 shows the granulometric curve of a first set of fine particles of bauxite that can be used in the method in accordance with the invention.

In this FIG. 1, the axis of the ordinates gives the quantity of particles expressed as a weight percentage as compared to the total weight of particles and the axis of the abscissa gives the diameter of the particles in micrometres (μm) on a logarithmic scale.

The granulometric curve shown here is a so-called "cumulative" curve, i.e. each point on this granulometric curve represents the percentage of particles that have a diameter smaller than or equal to the one that corresponds to the point of the curve studied.

For example, this granulometric curve indicates that 70% of the particles of the first set of particles have a diameter smaller than or equal to 100 μm.

Likewise, in this first set of particles, the median diameter d50 is equal to 60 μm, i.e. 50% of the particles of the first set have a diameter smaller than or equal to 60 μm.

The maximum diameter of the particles is here 300 μm, which means that 100% of the particles of this first set of particles have a diameter smaller than or equal to 300 μm.

Figure 2:
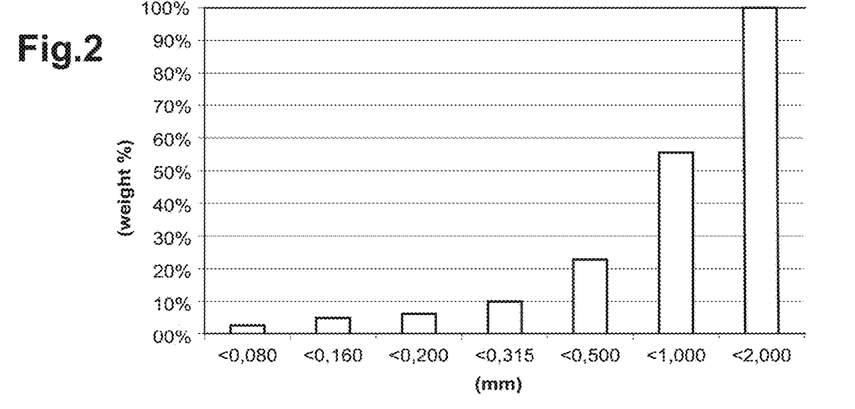
FIG. 2 is a bar chart showing the distribution of the diameters of a second set of particles of bauxite suitable for the invention.
Figure 3:
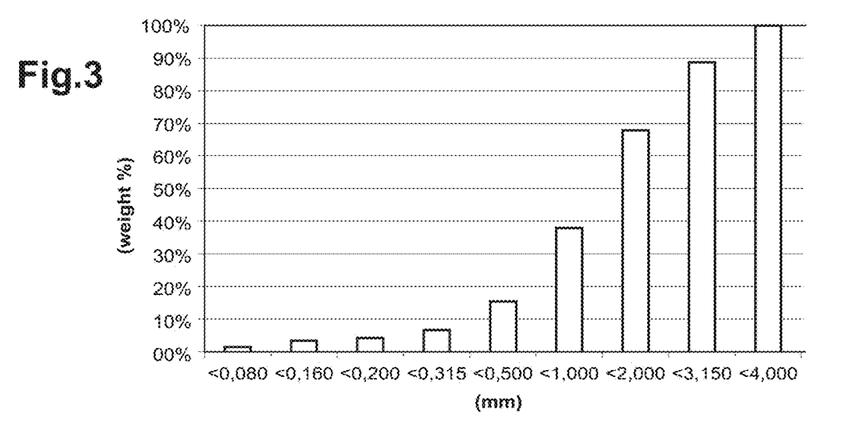
FIG. 3 is a bar chart showing the distribution of the diameters of a third set of particles of bauxite suitable for the invention.
Figure 4:
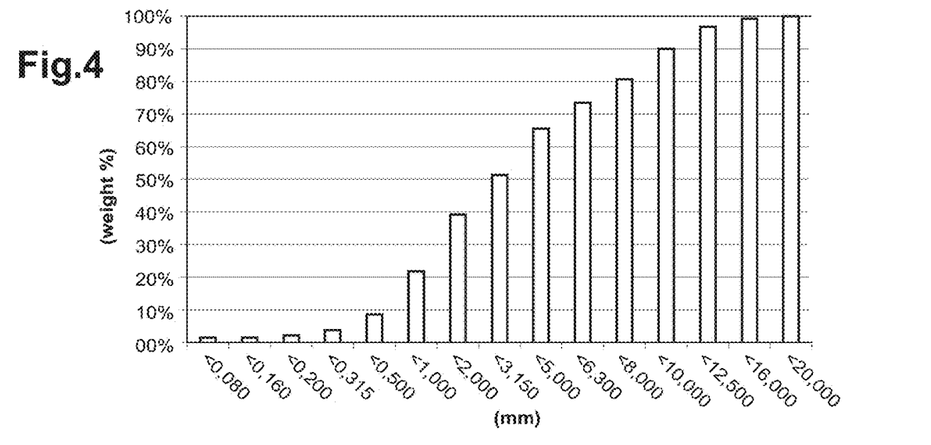
FIG. 4 is a bar chart showing the distribution of the diameters of a fourth set of particles of bauxite suitable for the invention.

FIGS. 2 to 4 show the granulometric diagrams of second, third and fourth sets of fine particles that can be used in the method in accordance with the invention.

The bar charts in FIGS. 2, 3 and 4, give the weight percentage of particles that have a diameter smaller than or equal to the one indicated at the bottom of each bar.

For example, the bar chart in FIG. 2 indicates that the median diameter d50 of the second set of particles suitable for the invention is comprised between 0.5 millimetre (mm) and 1 mm. It can be approximated that said median diameter d50 is in this case about 0.9 mm.

In this FIG. 2, it can be seen that the maximum diameter of the particles of this second set is 2 mm.

Similarly, the bar charts in FIGS. 3 and 4 respectively indicate that the median diameter d50 of the third set of fine particles suitable for the invention is comprised between 1 mm and 2 mm, and that the median diameter d50 of the fourth set of fine particles suitable for the invention is comprised between 2 mm and 3.15 mm.

It can be approximated that said median diameter d50 is about 1.4 mm for the third set of particles corresponding to the diagram shown in FIG. 3, and about 3 mm for the fourth set of particles corresponding to the diagram shown in FIG. 4.

The maximum diameter of the particles of the third set corresponding to the chart shown in FIG. 3 is 4 mm. It is 20 mm for the fourth set of particles corresponding to the chart shown in FIG. 4.

Generally, the median diameter d50 of the fine particles can vary according to the type of raw materials 7 used during the implementation of the method of the invention.

In particular, the median diameter d50 of the fine particles of raw material source of alumina and/or of aluminium can be different from the one of the fine particles source of calcium oxide and/or of calcium.

Advantageously, according to the invention, it can be envisaged placing into granulometric dimension the raw materials source of alumina ($Al_2O_3$) and/or of aluminium (Al) and source of calcium oxide (CaO) and/or of calcium (Ca) using a crusher before introducing them into the molten pool 11.

In other words, it can be envisaged reducing the diameter of the particles of raw materials in such a way as to obtain a set of fine particles of which the median diameter d50 is such as desired.

Moreover, preferentially, the raw material source of alumina ($Al_2O_3$) and/or of aluminium (Al) comprises, by weight as compared to total weight of said raw material source of alumina ($Al_2O_3$) and/or of aluminium (Al), at least 30%, even at least 40% or 50%, of alumina ($Al_2O_3$) and/or of aluminium (Al).

Preferentially, the raw material source of calcium oxide (CaO) and/or of calcium (Ca) comprises, by weight as compared to the total weight of said raw material source of calcium oxide (CaO) and/or of calcium (Ca), at least 50%, even at least 70% or 90%, of calcium oxide (CaO) and/or of calcium (Ca).

In the manufacturing method in accordance with the invention, the raw material source of alumina ($Al_2O_3$) and/or of aluminium (Al) is preferably chosen from: bauxite such as monohydrate bauxite and/or trihydrate bauxite, white bauxite, red bauxite, corundum grinding wheels, catalyst supports, refractory bricks, hydroxides, metallurgical aluminas, calcinated and melted aluminas, the by-products of the aluminium sector and manufacturing non-conformities with a high alumina content or one of the mixtures thereof.

Preferentially, during the implementation of the method according to the invention in the alternative of the furnace that has the electric heating means, the raw material source of alumina ($Al_2O_3$) and/or of aluminium (Al) contain little iron (Fe).

Also preferably, the raw material source of calcium oxide (CaO) and/or of calcium (Ca) is chosen from: limestone, lime and the by-products coming from methods that consume limestone and/or lime such as slurries or slags in steelmaking or electrometallurgy, or one of the mixtures thereof.

The raw materials source of alumina ($Al_2O_3$) and/or of aluminium (Al), and source of calcium oxide (CaO) and/or of calcium (Ca) can also contain iron (Fe) and silica ($SiO_2$) in variable quantities. For example, bauxite trihydrate can comprise by weight, from 46% to 50% of alumina ($Al_2O_3$), from 14% to 20% of iron oxide under different degrees of oxidation and from 7% to 12% of silica ($SiO_2$).

Furthermore, the raw materials source of alumina ($Al_2O_3$) and/or of aluminium (Al), and source of calcium oxide (CaO) and/or of calcium (Ca) introduced in step a) of the method according to the invention are preferentially dosed in such a way that the Al/Ca mass ratio in the finished product, i.e. in the calcium aluminate gathered at the outlet of the tank 15, is comprised between 0.5 and 1.7, and preferably between 0.9 and 1.5.

More preferentially, the aluminium (Al) over calcium (Ca) mass ratio in the calcium aluminate gathered at the outlet of the tank 15 is comprised between 1 and 1.1.

In order to respect this mass ratio, the raw material source of alumina ($Al_2O_3$) and/or of aluminium (Al) and the raw material source of calcium oxide (CaO) and/or of calcium (Ca) are dosed, either when they are in the state of fine particles having the desired median diameter d50, or before they are reduced in order to have said desired median diameter d50.

Then, they are mixed in a mixer in order to form the raw materials 7 which are introduced into the tank 15 of the furnace 1. This mixing is carried out on the raw materials reduced to the state of fine particles with the desired median diameter d50.

The raw materials 7 include more preferably, by weight as compared to the total weight of said raw materials 7, at least 70% of the set formed by calcium oxide (CaO), alumina ($Al_2O_3$), an iron oxide (for example $Fe_2O_3$) and silica ($SiO_2$).

In other terms, calcium oxide (CaO), alumina ($Al_2O_3$), an iron oxide (for example $Fe_2O_3$) and silica ($SiO_2$) represent at least 70% of the raw materials 7, by weight as compared to the total weight of said raw materials 7.

By at least 70%, it is meant that the raw materials 7 can include 70%, 75%, 80%, 85% even 90% of the set formed by calcium oxide (CaO), alumina ($Al_2O_3$), an iron oxide (for example $Fe_2O_3$) and silica ($SiO_2$), by weight as compared to the total weight of said raw materials 7.

The raw materials or the fuel reagents can contain other minor phases and/or impurities, such as sulphates $SO_3$. For example, a content in sulphate $SO_3$ smaller than 4%, by weight as compared to the total weight of the raw materials 7, in particular smaller than 3%, smaller than 2%, in particular smaller than 1%, is compatible with this invention.

The raw materials 7 do not contain any raw material that would specifically be a source of calcium sulphate $CaSO_4$ or specifically a source of fluorinated compounds.

In other words, no calcium sulphate $CaSO_4$ or fluorinated compound is specifically added to the raw materials 7. However, said raw materials 7 include impurities and can consequently contain traces of fluorinated compounds or calcium sulphate.

The raw materials 7 can for example have the compositions described in following tables 3 and 4.

TABLE 3

First example of raw materials 7 used

| Components | d50 (μm) | Proportion by weight |
|---|---|---|
| Limestone | 250 | 48% |
| So-called white bauxite | 100 | 48% |
| Silica | 250 | 4% |

TABLE 4

Second example of raw materials 7 used

| Components | d50 (μm) | Proportion by weight |
|---|---|---|
| Limestone | 250 | 38% |
| So-called white bauxite | 100 | 62% |

The operator can carry out the dosage and the mixing of the raw materials source of alumina and/or of aluminium (Al) and source of calcium oxide (CaO) and/or of calcium (Ca) before said raw materials source of alumina ($Al_2O_3$) and/or of aluminium (Al) and source of calcium oxide (CaO) and/or of calcium (Ca) are transported to the loading system 2 of the furnace 1 and in particular to the storage silo 6. This transport can be carried out by the intermediary of a pump or any other means of transfer.

Alternatively, the dosage and the mixing of said raw materials source of alumina ($Al_2O_3$) and/or of aluminium (Al) and source of calcium oxide (CaO) and/or of calcium (Ca) can be carried out directly in the silo 6 of the loading system 2 of the furnace 1 when the latter is provided with two separate compartments that open into the common portion of the silo 6.

Advantageously, according to the method of manufacture in accordance with the invention, in step a), the temperature of the molten pool 11 is comprised between 1,300° C. and 1,700° C.

More preferably this temperature is comprised between 1,400° C. and 1,600° C.

Furthermore, particularly advantageously, this invention proposes to control the partial pressures of gas contained in the chamber formed by the dome 5 and the tank 15 of the furnace 1, in such a way as to obtain calcium aluminates that have a controlled mineralogy.

Thus, advantageously, also in step a), the molten pool 11 is placed under a reducing atmosphere.

In chemistry, very generally, a reducer is a chemical species that can transfer one or several electrons to another chemical species, called an oxidant, during an oxide-reduction reaction. Inversely, an oxidant is a chemical species able to capture one or several electrons during an oxide-reduction reaction.

"Reducing atmosphere" here means an atmosphere of which the oxidation capacity has been reduced by decreasing the proportion of oxidant that it contains.

In particular, here, the reducing atmosphere contains a reduced content, as compared to air, in dioxygen $O_2$, which is an oxidant compound.

Furthermore, here, the reducing atmosphere comprises a proportion of gases which are more reducing than air in general, and than dioxygen $O_2$ in particular.

Here, said reducing atmosphere under which is placed the molten pool 11 comprises carbon monoxide (CO).

In particular, the method according to the invention proposes to control the content in carbon monoxide (CO) contained in the atmosphere located above the molten pool 11.

Said average content in carbon monoxide (CO) of the reducing atmosphere is here comprised between about 0.1% and 100%.

The content of the reducing atmosphere carbon monoxide (CO) can for example be equal to 0.09%; 0.1%; 0.15%; 0.2%; 0.5%; 0.8%; 1%; 5%; 10%; 20%; 30%; 40%; 50%; 60%; 70%; 80%; 90%; or 100%, in mole as compared to the quantity of total material of the gas analysed.

Particularly advantageously, the control of the content in carbon monoxide (CO) of the reducing atmosphere located above the molten pool 11 makes it possible to control the mineralogical phases, and in particular the mineralogical phase C12A7, of the calcium aluminates obtained at the outlet of the tank 15.

Indeed, the applicant discovered that when the atmosphere located above the molten pool 11 is rich in carbon monoxide (CO), the calcium aluminates obtained are rich in phase C12A7. The inverse is also true.

Yet, it is particularly advantageous to control the proportion of mineralogical phase C12A7 contained in the calcium aluminate gathered at the outlet of the tank 15 because this mineralogical phase C12A7 influences the reactivity of this calcium aluminate used as a hydraulic binder.

More precisely, the mineralogical phase C12A7 is an accelerator of the setting of the calcium aluminates. In other words, calcium aluminates harden all the more faster in contact with water as they contain a larger proportion of mineralogical phase C12A7, as compared to the other mineralogical phases that these calcium aluminates may contain.

Thus, the method according to the invention advantageously makes it possible to control the fastness of setting of the calcium aluminates produced.

Furthermore, advantageously, according to the invention, in step a), the residence time of said fine particles in said molten pool 11 is smaller than 24 hours.

This residence time is preferably comprised between 30 minutes and 9 hours and more preferentially, it is equal to 8 hours.

These residence times are short, which makes it possible to ensure a satisfactory output.

The particles that do not all have exactly the same diameter are not all displaced at the same speed in the tank 15. Consequently, the residence time is here an average residence time of said fine particles in the molten pool 11.

At the end of this residence time, the operator obtains at the outlet of the tank 15 the desired product, namely the mass of liquid calcium aluminates 16, without any unmelted raw material.

The mass of liquid calcium aluminates 16 is the result of a set of progressive physical-chemical reactions that allow for the drying, dehydrating, decarbonation of the raw materials source of alumina ($Al_2O_3$) and/or of aluminium (Al) and source of calcium oxide (CaO) and/or of calcium (Ca) in order to form calcium aluminate.

During the method according to the invention, these physical-chemical reactions are carried out in the molten pool 11 contained in the tank 15 of the furnace 1 and this, in a single step, which is an advantage with regards to operating costs.

During these physical-chemical reactions, and during the melting of the raw materials 7, bubbles are generated in the molten pool 11.

These bubbles participate, by stirring, in the homogenisation of the molten pool 11, namely of the molten pool of calcium aluminate.

Alternatively, it can be provided that the drying, dehydrating and decarbonation of the fine particles be initiated in a preheating step prior to step a). According to this alternative, no bubbles are generated in the molten pool 11 because no decarbonation is caused therein.

In step b), after their residence in the molten pool 11, the fine particles of raw material having become a mass of liquid calcium aluminates 16, the volume of the molten pool 11 increases in such a way that the mass of liquid calcium aluminate 16 overflows through the outlet opening 12 of the tank 15.

This mass of liquid calcium aluminate 16 is discharged through the discharge duct 13 of the discharge system 3 of the furnace 1.

Thus, during the operation of the furnace 1, the introduction of the solid fine particles of raw material into the tank 15 increases the volume of the molten pool 11, and a portion of the mass of liquid calcium aluminates 16 present in said tank 15 ends up overflowing through the outlet opening 12 of the tank 15.

Steps a) and b) are both carried out continuously and simultaneously.

Thus, simultaneously, at the inlet opening 9 of the tank 15, the solid fine particles are introduced into the tank 15 (step a), and at the outlet opening 12, the mass of liquid calcium aluminate 16 is gathered (step b), without discontinuation.

The flow of material created between the inlet and the outlet of the furnace flows continuously from the inlet to the outlet.

The fine particles circulate slowly, due to the viscosity of the molten pool 11, between the inlet opening 9 and the outlet opening 12. As such they reside in the tank 15 long enough to melt therein and react in order to increase the mass of liquid calcium aluminate 16.

The flow of material in the tank 15, from the inlet opening 9 to the outlet opening 12, is generated by the discharge of the mass of calcium aluminate 16 via the outlet opening 12.

Thus, remarkably, the method according to the invention makes it possible to manufacture calcium aluminates continuously.

In a step subsequent to step b), the operator cools the mass of liquid calcium aluminates 16 down.

Preferentially, this cooling takes place naturally, i.e. at ambient temperature in the cooling zone connected to the discharge system 3.

Alternatively, it can be envisaged cooling the mass of liquid calcium aluminates in a controlled manner. In particular, it can be envisaged cooling the mass of liquid calcium aluminates according to any method known to those skilled in the art, such as blowing with compressed air, tempering in water, or methods used for the granulation of slurries in blast furnaces or the production of rock wool.

Once the cooling is complete, the mass of calcium aluminates 16 is in the form of clinker. Clinker is a hardened mass of calcium aluminate. According to the type of cooling chosen, clinker can have different shapes and sizes. In general, this clinker is in the form of blocks or hard granules that have a diameter ranging up to a few tens of centimetres.

The clinker thus obtained is then, more preferably, discharged by a belt or any other means of conveyance to a hall, or a silo, where it may be stored.

This clinker can possibly be crushed, more or less finely, in order to form a calcium aluminate cement, namely a calcium aluminate in the form of powder that has active hydraulic properties.

Preferably, the crushing of said clinker is carried out by means of a ball mill (cylindrical device put into rotation lined with shielded plates and loaded with steel balls).

Alternatively, the crushing can be carried out in crushers with vertical grinding wheels, or in any type of crusher that has a resistance to wear and tear that is sufficient and is adapted for reduction into small diameters.

The calcium aluminate cements thus obtained can be used in applications of construction chemistry or refractory chemistry for example.

Furthermore, the calcium aluminate cements can then undergo various treatments or be mixed with other compounds. For example, the adding of additives such as calcium sulphate, fly ash, pozzolana, gypsums, is possible in order to valorise the calcium aluminate cement in various applications.

EXAMPLES

The following examples 1 to 4 make it possible to realise the importance of the content in carbon monoxide (CO) in the atmosphere of the chamber in order to control the mineralogical phases of the calcium aluminate cements obtained.

Furthermore, these examples prove that the method according to the invention makes it possible to obtain calcium aluminates that comprise a controlled content of mineralogical phase C12A7.

Hereinbelow, table 5 shows all the experimental conditions implemented in order to carry out the examples 1 to 4.

In particular, in this table 5, the content in carbon monoxide (CO) is given as a percentage by weight, i.e. by weight of carbon monoxide (CO) as compared to the total weight of the constituents of the atmosphere.

Furthermore, the Al/Ca mass ratio corresponds to the ratio of the total weight of aluminium over the total weight of calcium, contained in the final calcium aluminate obtained. Thus, the quantities of aluminous and calcareous raw materials introduced into the furnace are calculated in such a way as to respect this Al/Ca mass ratio in the final product. Before they are introduced into the furnaces, these raw materials are mixed and homogenised.

In the examples 1 to 4, the raw materials 7 are obtained by mixing homogeneously:

white bauxite comprising, by weight as compared to the total weight of the white bauxite powder, 86.5% of alumina $Al_2O_3$, 5.6% of silica $SiO_2$, 2.1% of iron oxide $Fe_2O_3$, and 0.1% of loss on ignition, with limestone comprising, by weight as compared to the total weight of the limestone powder, 54.1% of lime CaO, and 42% of loss on ignition, in a bauxite:limestone mass ratio of 1:1.68.

The loss on ignition here groups together the volatile elements such as the residual moisture in the case of bauxite or the carbon dioxide CO2 in the case of limestone.

The raw materials thus introduced at the inlet of the furnace make it possible to obtain a lime over alumina mass ratio C/A of the final calcium aluminate obtained at the outlet of the tank comprised between 1 and 1.1 (see table 5).

The diameter d50 corresponds to the median diameter, given in micrometres, of all of the fine particles of raw materials introduced into the furnaces. In practice, in the examples 1 to 4, the fine particles of limestone and of bauxite have a median diameter d50 of 250 micrometres.

Finally, the residence time corresponds to the average residence time of the fine particles in the molten pool. It is given in hours.

In example 1, the furnace used is a combustion furnace. The content in carbon monoxide (CO) is inherent to the combustion. It is measured at the smoke exhaust opening of the furnace. The raw materials used are so called white bauxites, which contain very little or even no iron at all, i.e. less than 10%, preferably less than 5%, of iron, and of limestone.

In examples 2, 3 and 4, the furnace used is an electric furnace provided with a system for adding gas. The raw materials used are also white bauxites and limestone.

In example 2, the content in carbon monoxide (CO) is chosen equal to 100%. This carbon monoxide (CO) is directly introduced into the furnace by the system for adding gas.

In examples 3 and 4, the content in carbon monoxide is chosen equal to 0%.

In example 3, the system for adding gas introduces dinitrogen ($N_2$), in such a way that the molten pool is placed in a 100% nitrogen atmosphere.

In example 4, the system for adding gas introduces air at atmospheric pressure, in such a way that the molten pool is placed in air.

TABLE 5

|  | Example 1 | Example 2 | Example 3 | Example 4 |
| --- | --- | --- | --- | --- |
| Type of furnace | Combustion | Electric | Electric | Electric |
| Raw material | White bauxites, Limestone | White bauxites, Limestone | White bauxites, Limestone | White bauxites, Limestone |
| d50 (μm) | 250 | 250 | 250 | 250 |
| Temperature (° C.) | 1500-1600 | 1400 | 1400 | 1400 |
| Content in CO (%) | 0.1 | 100 | 0 | 0 |
| Residence time (h) | 8 | 1 | 1 | 1 |
| C/A mass ratio | 1-1.1 | 1-1.1 | 1-1.1 | 1-1.1 |

The final composition of the calcium aluminate cements obtained is evaluated according to a method of diffraction with X rays.

This method of diffraction with X rays is described in more detail in Calcium Aluminate Cement: Proceeding of the Centenary Conference Avignon 30 Jun. 2008 *"Quantitative mineralogical chemical and application investigations of high Alumina Cements from different sources"* H. Pollmann & Al.

In particular, the method of diffraction with X rays used responds to the respective French and European standards in effect, NF EN 13925-1 and EN 13925-1.

The composition of the calcium aluminate cement obtained in example 1, respectively in examples 2 to 4, is given in table 6, respectively in table 7, hereinbelow, by weight as compared to the total weight of the composition of the cements:

TABLE 6

| Mineralogical phases | Percentages by weight |
| --- | --- |
| CA (CaO $Al_2O_3$, or $CaAl_2O_4$) | 67.7 |
| C2AS (2 CaO $Al_2O_3$ $SiO_2$, or $Ca2 Al_2O_7Si$, or gehlenite) | 22.2 |
| C12A7 (12CaO $7Al_2O_3$, or $Ca_{12}Al_{14}O_{33}$) | 0.3 |
| Others | 9.8 |

TABLE 7

| Mineralogical phases and other components | Example 2 | Example 3 | Example 4 |
| --- | --- | --- | --- |
| CA (CaO $Al_2O_3$) | 59.6 | 66.5 | 67.1 |
| C2A (2CaO $Al_2O_3$, or $Ca_2Al_2O_5$) | 13.5 | 13.7 | 13.7 |
| C12A7 (12CaO $7Al_2O_3$, or $Ca_{12}Al_{14}O_{33}$) | 15.6 | 7.3 | 5.8 |
| C3MA2 (3CaO $2Al_2O_3$ MgO, or $Ca_3MgAl_4O_{10}$) | 5.9 | 6.0 | 6.0 |

TABLE 7-continued

| Mineralogical phases and other components | Example 2 | Example 3 | Example 4 |
| --- | --- | --- | --- |
| CT2 ($3CaO\ 2TiO_2$, or $Ca_3Ti_2O_7$) | 1.4 | 1.4 | 1.4 |
| C3A ($3CaO\ Al_2O_3$, or $Ca_3Al_2O_6$) | 1.4 | 3.1 | 3.6 |
| C2F ($2CaO\ Fe_2O_3$, or $Ca_2Fe_2O_5$) | — | 1.6 | 1.5 |
| Fe | 1.4 | — | — |
| Others | 1.2 | 0.4 | 0.9 |

Moreover, in other examples of implementation of the method according to the invention, calcium aluminates were obtained in the furnace of the example 1, using the same raw materials as those used in example 1, but having respectively a median diameter d50 of about 400 µm and of 2 mm.

These calcium aluminates did not have any unmelted items at the outlet of the furnace, despite the larger median diameter d50 of the raw materials introduced into the furnace.

In a last example of implementation of the method according to the invention, a calcium aluminate was also obtained in the furnace of example 1, using red bauxites and limestone, with all of the other experimental conditions remaining identical to those described in example 1.

All of the calcium aluminates obtained in the examples hereinabove described hereinabove are intended for applications in construction chemistry, or in the field of refractory concretes.

The invention claimed is:

1. A method for manufacturing calcium aluminates in an industrial furnace, comprising the steps of:
   a) continuously introducing fine particles of a raw material source of alumina ($Al_2O_3$) and/or of aluminium (Al) and of a raw material source of calcium oxide (CaO) and/or of calcium (Ca) having a median diameter d50 smaller than or equal to 6,000 µm into a tank made of refractory material containing a molten pool that is constantly heated, in order to melt said fine particles of raw material, and
   b) continuously gathering a mass of calcium aluminates liquid at the outlet of the tank, wherein
   in step a) the molten pool is placed under a reducing atmosphere comprising at least 0.5% carbon monoxide (CO) in mole compared to the quantity of total material of the gas analyzed.

2. The method according to claim 1, wherein, in step a), said reducing atmosphere comprises from 0.5% to 100% of carbon monoxide (CO) on average.

3. The method according to claim 1, wherein the temperature of the molten pool of the calcium aluminates is comprised between 1,300° C. and 1,700° C.

4. The method according to claim 3, wherein the temperature of the molten pool of the calcium aluminates is comprised between 1,400° C. and 1,600° C.

5. The method according to claim 1, wherein the residence time of said fine particles of raw material in said molten pool of calcium aluminates is less than 24 hours.

6. The method according to claim 5, wherein the residence time of the said fine particles of raw material in said molten pool of calcium aluminates is comprised between 30 minutes and 9 hours.

7. The method according to claim 1, wherein, in step a), the raw material source of alumina ($Al_2O_3$) and/or of aluminium (Al) introduced into the tank is selected from the group consisting of: bauxite, corundum grinding wheels, catalyst supports, refractory bricks, hydroxides, metallurgical aluminas, calcinated and melted aluminas, the by-products of the aluminium sector, manufacturing non-conformities with a high alumina content, and mixtures thereof, and the raw material source of calcium oxide (CaO) and/or of calcium (Ca) introduced into the tank is selected from the group consisting of: limestone, lime and the by-products coming from methods that consume limestone and lime such as slurries or slags in steelmaking or electrometallurgy, and mixtures thereof.

8. The method according to claim 1, wherein the fine particles of raw material have a median diameter d50 comprised between 100 µm and 1,000 µm.

9. The method according to claim 8, wherein the fine particles of raw material have a median diameter d50 comprised between 150 µm and 500 µm.

10. The method according to claim 1, wherein, after step b), the mass of liquid calcium aluminates (16) gathered at the outlet of the tank is cooled down.

11. The method according to claim 10, wherein the cooling is performed naturally or in a controlled manner.

12. The method according to claim 10, wherein the cooled mass of calcium aluminates (16) is crushed in order to form a calcium aluminate cement.

13. The method according to claim 1, wherein said fine particles of raw material source of alumina ($Al_2O_3$) and/or of aluminium (Al) and of raw material source of calcium oxide (CaO) and/or of calcium (Ca) are introduced into the tank in the form of a free powder.

* * * * *